Feb. 9, 1971 H. T. DE GRAFFENREID ET AL 3,561,298
REMOVABLE SEAL PLUG FOR CLOSING THE UPPER END
OF SELF-PUNCHING T FITTINGS
Filed April 9, 1969
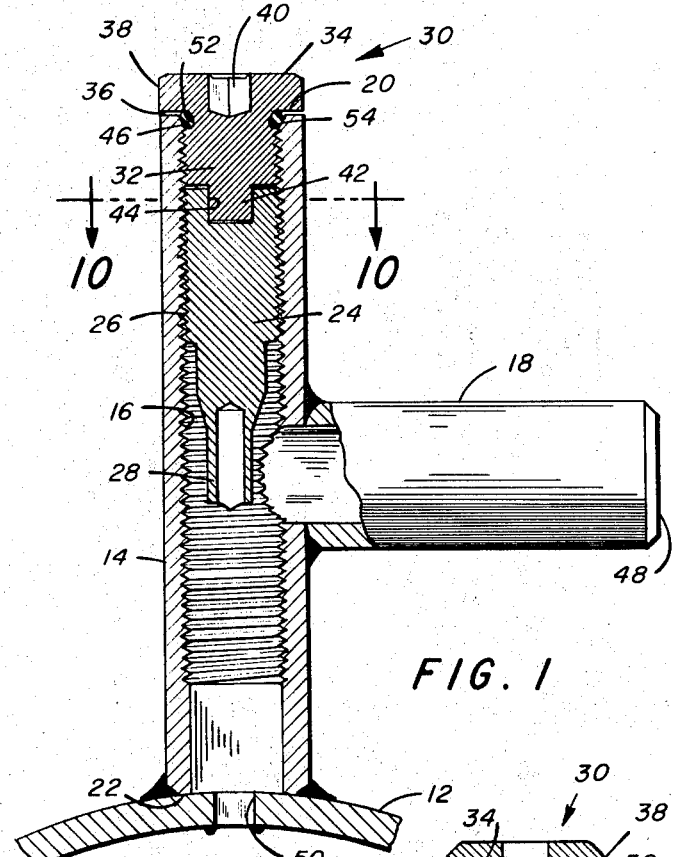
FIG. 1
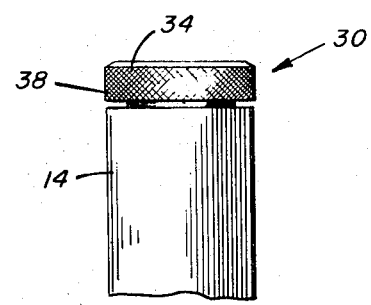
FIG. 2
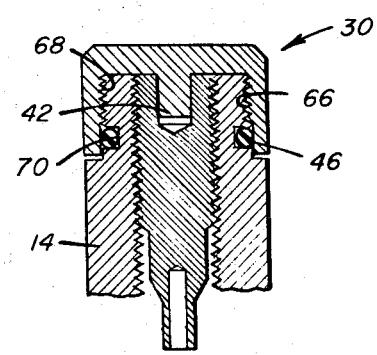
FIG. 8
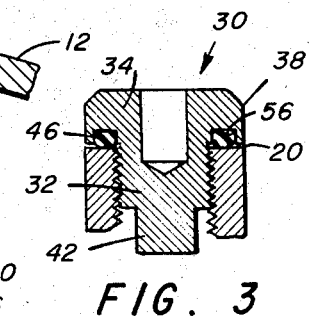
FIG. 3
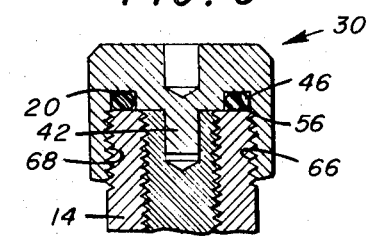
FIG. 9
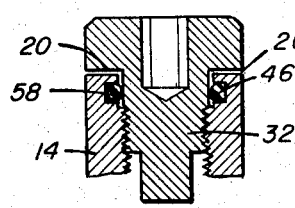
FIG. 4
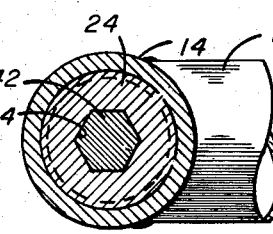
FIG. 10
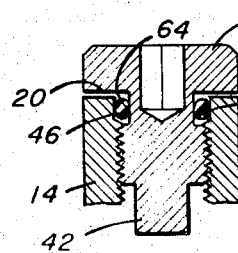
FIG. 6
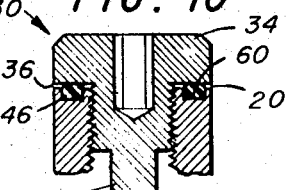
FIG. 5
FIG. 7
INVENTORS.
HOWARD T. DeGRAFFENREID
JUDSON C. COLE
BY
Head & Johnson
ATTORNEYS United States Patent Office 3,561,298
Patented Feb. 9, 1971

3,561,298
REMOVABLE SEAL PLUG FOR CLOSING THE UPPER END OF SELF-PUNCHING T FITTINGS
Howard T. De Graffenreid, Inola, and Judson C. Cole, Tulsa, Okla., assignors to Continental Industries, Inc., Tulsa, Okla., a corporation of Oklahoma
Filed Apr. 9, 1969, Ser. No. 814,641
Int. Cl. B23b 41/08
U.S. Cl. 77—42
16 Claims

ABSTRACT OF THE DISCLOSURE

This invention relates to a removable seal plug for closing the upper end of a self-punching T fitting. More particularly, the invention relates to a self-punching T fitting including a tubular body adapted to be welded to a pipe, a punch threadably positioned within the tubular body adaptable for rotation to engage and punch a hole in the pipe, and an improved seal plug member for closing the upper end of the tubular body member, the plug member serving to accurately position and prevent the movement of the punch member in the body and to securely seal the body against fluid leakage.

BACKGROUND, SUMMARY AND OBJECTS OF THE INVENTION

Self-punching T fittings are at the present time widely used, particularly in the gas industry, as a means of providing a branch tap to a gas main. For a background and history of self-pnching T fittings reference may be had to Pat. Nos. 3,247,862; 3,295,398 and others issued by the United States Patent Office. Generally a self-punching T fitting is a device which may be attached to a pipe, usually by welding one end of the device to the pipe. The T fitting typically consists of an upstanding tubular body member which is internally threaded and includes an externally threaded punch member within the body. The punch member is defined by a lower reduced diameter punched end portion. The punch includes a tool recess in the upper end. By rotating the punch inside the tubular body it is advanced downwardly until it engages the pipe. Further rotation of the punch member causes it to force a hole in the pipe by the combined pressure and rotation of the punch end against the pipe. A branch member extends from the tubular member intermediate the ends thereof and communicating with the interior of the tubular member. After the punch has formed an opening in the pipe to which the T fitting is attached, the punch may be rotated in the opposite direction to withdraw it. As the punch is withdrawn above the branch member communication is then freely provided between the branch and the interior of the pipe. After the punch member is withdrawn to a position above the tubular branch the upper end of the tubular body is closed, such as a pipe cap, as is illustrated in the United States patents referred to.

The previously utilized types of self-punching T fittings have worked satisfactorily except that in some instances the cap or sealing plug has caused some problems. The sealing arrangement used by most manufacturers up to the present time includes external threads on the upper end of the tubular member and an internally threaded pipe cap. Such arrangement provides only metal to metal threaded seal to prevent the escapement of gas from the interior of the T fitting.

An additional problem with existing types of punching T's is that there is provided no means of referencing the punch member inside the tubular member. That is, there is no means for the user to be positive that the punch member is sufficiently drawn toward the top of the tubular member so as not to interfere with the free flow of gas or liquid through the lower portion of the tubular body member and into the tubular branch member. Another shortcoming of the existing type of closure means for self-punching T fittings is that they have provided no means to insure that vibration will not cause the punch member to rotatably travel downwardly inside the tubular member to close, or obstruct, the branch member and thereby interfere with the free flow of fluid through the T fitting.

This invention overcomes the above described difficulites, problems and limitations connected with the existing types of closure means for self-punching T fittings. It is therefore a general object of this invention to provide a self-punching T fitting having an improved seal plug means. Another, and more specific object of this invention is to provide a self-punching T fitting having an improved seal plug means effecting more positive seal of the T fitting.

Another specific object of this invention is to provide a self-punching T fitting having an improved seal plug means including means of referencing the punch member in its proper position in the upper end of the self-punching T fitting and to lock the punch member against inadvertent rotaiton and movement inside the punch member.

These as well as more specific objects of the invention will be understood by reference to the description and claims, taken in conjunction with the drawings.

DESCRIPTION OF THE VIEWS

FIG. 1 is an elevational view, shown primarily in cross section, of a self-punching T fitting affixed to the external surface of a pipe and showing the improved plug seal of this invention in position sealing the upper end of the T fitting.

FIG. 2 is a partial external view showing the upper end of a T fitting of this invention with the improved seal plug means.

FIGS. 3, 4, 5, 6, 7, 8 and 9 are cross-sectional views of the upper end of the tubular body portion of a self-punching T fitting having the improved plug seal of this invention and showing various arrangements for providing resilient seal means to insure positive leakproof closure of the T fitting.

FIG. 10 is a cross-sectional view taken perpendicularly of the tubular axis of the tubular body portion and along line 10—10 of FIG. 1.

DETAILED DESCRIPTION

Referring first to FIG. 1, the improved self-punching T fitting of this invention is shown in cross section. The T fitting is shown welded to a pipe 12. The basic portions of the T fitting include: a tubular body 14 having internal threads 16 in the interior circumferential surface; a tubular branch member 18 extending from the tubular body 14 and secured to the body portion such as by welding, the tubular branch having communication with the interior of the tubular body and being positioned between the tubular body upper end 20 and lower end 22; a cylindrical punch member 24 having an externally threaded portion 26 and a lower, reduced diameter punch end 28; and a removable seal plug member generally indicated by the numeral 30.

The tubular body 14, a branch member 18, and punch member 24 are generally of the known configurations of other types of self-punching T fittings, such as illustrated and described in the prior issued United States patent to which reference has been previously made. The basic improvement of this invention concerns the seal plug member 30.

The plug member 30 of the embodiments shown in FIGS. 1, 3, 4, 5 and 6 is defined in part by a cylindrical externally threaded portion 32, the threads on portion 32 being received by the internal threads 16 of tubular body 14. The threads on cylindrical portion 32 are of the same diameter and lead as the threads on punch member 24. The plug member 30 includes an integral enlarged diameter flange portion 34 which defines a radial planar lower flange face 36 which engages, when the plug member is fully threadably advanced into body 14, the body upper end 20. The circumferential cylindrical surface 38 of flange portion 34 may be knurled, as shown in FIG. 2, or may be provided with a wrench receiving flats, such as a hex configuration like a typical nut or bolt head.

In the upper end of plug member 30 is a tool receiving recess 40. The tool receiving recess 40 is typically of an internal hex cross-sectional configuration adaptable to receive a large type Allen wrench, although obviously it may be of any other noncircular configuration, such as of square cross-sectional configuration.

The plug member 30 also includes an integral coaxial downwardly extending tool extension 42 of a cross-sectional configuration to be slidably and nonrotatably received in tool recess 44 in the upper end of punch member 24. The configuration of the tool recess 44 and tool extension 42 may be any noncircular configuration although the preferred arrangement is a hex or square configuration. Preferably, the tool receiving recess 44 in plug 24 and the tool receiving recess 40 in plug member 30 are of the same cross-sectional configurations so that the same tool, of the Allen wrench type, may be utilized for threadably advancing each of these members. In this event, the tool extension 42 would be of the same cross-sectional configuration as the Allen wrench type tool utilized to threadably advance the punch member 24 and seal plug member 30.

To assure leakproof closure of the T fitting, a resilient gasket member 46 is provided between the seal plug member 30 and the upper end of tubular body 14.

OPERATION

When it is desired to provide means for attaching a branch outlet to pipe 12 the tubular body portion 14 of the T fitting of this invention is welded onto the pipe as shown. Next, a branch pipe may be welded or otherwise affixed to the outer end 48 of tubular branch member 18. The seal plug member 30 is removed and a tool (not shown) is inserted into tool recess 44 in the top of punch member 24. The punch member is then rotated by the tool so that it is threadably axially advanced downwardly within the tubular body 14 until the lower end of the punch end 28 engages pipe 12. Further rotational advancement of the punch member forces a hole 50 in pipe 12 as shown. After hole 50 is formed the punch member 24 is rotated in the opposite direction, withdrawing it upwardly past the tubular branch member 18 so that communication is now provided between the interior of pipe 12, the interior of the lower portion of the tubular body 14, and the interior of branch member 18. If desired, the punch member 24 may function as a valve, that is, it can be rotated downwardly so that the lower punch end 28 engages hole 50 to close the opening. In the normal installation, however, once the hole 50 has been punched providing communication to the branch line connected to the outer end 48 of branch member 18 the punch member 24 is drawn into the upper position of the tubular body 14 and remains there. The punch member 24, even though it may not be required for further use cannot safely be withdrawn from the interior of the tubular member 14 without permitting gas or other fluid carried by the pipe 12 to escape. For this reason, the punch member 24 is normally rotated to the upper end of the tubular body 14 and left there.

The method of operation described up to this point is typical of the existing state of the art. In the existing art a cap is threaded onto exterior threads on the upper end of tubular body 14 to seal the tubular body against the escape of gas. This existing arrangement has disadvantages as previously set forth. By the principles of this invention the punch member 24 is rotated, after hole 50 has been punched, so that the upper end is approximately flush with the body upper end 20. The tool extension 42 of the seal plug member 30 is then inserted into the tool recess 44 in plug member 24 and the seal plug member is then rotated in a direction to threadably advance both the punch member 24 and the plug member 30 threadably downwardly within the tubular body 14. This threaded advancement may be accomplished by applying wrenches to the exterior circumferential surface 38 of the plug member flange portion 34, or by use of an Allen type wrench received in tool recess 40. In the preferred arrangement, wherein tool recess 40 in plug member 30 is of the same cross-sectional configuration as tool recess 44 in punch member 24, the same tool may be utilized for punching hole 50 as is used for securing the plug member 30 in the top of the T fitting. Plug member 30 is threadably downwardly rotated until the flange face 36 of flange portion 34 engages the upper end 20 of tubular body 14. In the preferred arrangement wherein a resilient gasket 46 is utilized the threaded downward advancement of the plug member 30 is carried out until the gasket is tightly compressed insuring a leakproof seal of the T fitting.

The seal plug member arrangement of this self-punching T fitting overcomes many disadvantages and disadvantages of existing T fittings. By use of gasket 64 resilient seal means is provided insuring a leakproof closure of the fitting. Most particularly, the punch member 24 is locked and properly spaced within the upper end of the T fitting. This feature assures that workmen installing the T fitting leaves the punch 24 in its proper position. The provision of the tool extension 42 received in tool recess 44 prevents the punch 24 from inadvertently rotating and axially advancing downwardly within the tubular body 14 to interfere with flow into branch member 18.

The T fitting of this invention is arranged such that the relationships between the axial length of the tubular body member 14, the punch member 24, and the plug member 30 are such that when plug member 30 is securely seated and with the tool extension 42 received in the tool recess 44 of plug member 24 the plug member is properly positioned so as to insure that no restriction of flow of the fluid from the interior of the pipe 12 to branch outlet 18 occurs. By the arrangement wherein the tool recess 44 in punch member 24 and tool recess 40 in plug member 30 are the same cross-sectional configuration, only one tool is required to form hole 50 in pipe 12 and to seal the fitting upon the completion of installation.

ALTERNATE ARRANGEMENTS

Gasket member 36 may be arranged in a variety of relationships. In FIG. 1 plug member 30 is provided with a reduced diameter recess or groove 52 immediately below the flange base 36, the groove 52 receiving gasket 46. In addition, the upper interior end of tubular body 14 is conically tapered at 54 to provide a seal surface against which gasket 46 is urged as the plug member is threaded into sealed position.

FIGS. 3, 4, 5, 6, 7, 8 and 9 show alternate embodiments for securing gasket 46. In FIG. 3 an upwardly extending groove 56 is provided in flange face 36, the groove 56 being intermediate the external circumferential surface 38 of flange portion 34 and the cylindrical portion 32. Groove 56 receives gasket 46 therein so that when the plug is threaded ot closed or sealed position gasket 46 bears against the upper planar end 20 of tubular body 14.

In the arrangement of FIG. 4 a groove 58 is provided in the interior circumferential surface of the tubular body 14 adjacent and slightly below the upper planar end 20. Gasket 46 positioned in groove 58 engages the circumferential surface, which may be unthreaded in an area opposite the groove 58, of the cylindrical portion 32 of plug 30.

FIG. 5 is essentially the obverse of FIG. 3, that is, a groove 60 is provided in the planar upper end 20 of tubular body 14 which receives the gasket 46. In this arrangement the gasket engages the flange face 36 of the plug member flange portion 34.

In the arrangement of FIG. 6 an enlarged internal diameter recess 62 is provided in tubular body 14 extending to the upper end 20 and a mating reduced diameter recess 64 is provided in plug member 30 immediately below flange portion 34. Such recess may be of a cylindrical configuration as shown in FIG. 6 or of a semicircular configuration as shown in FIG. 1. Gasket 46 is received between the recess 62 and recess 64.

FIGS. 7, 8 and 9 show arrangements in which the plug member 30 is provided with an internal axial threaded recess 66 which receives external threads 68 on the upper end of tubular body portion 14. In FIGS. 7 and 8 the portion of tubular body 14 having threads 68 is of reduced external diameter while in FIG. 9 the body portion 14 is of continuous external diameter. In FIG. 7 gasket 46 is retained in a groove 60 in the tubular body upper end 20 as described with reference to FIG. 5. In FIG. 9 gasket 46 is retained in an upwardly extending groove 56 in plug member 32 substantially as described with reference to FIG. 3. In FIG. 8 a groove 70 is provided in the exterior circumferential surface of tubular body 14 below external threads 68. Groove 70 receives gasket 46 which engages the plug member internal circumferential surface 46, preferably in an unthreaded area.

In practicing the invention utilizing the embodiment of FIGS. 7, 8 and 9, the punch member 24 will have to be withdrawn so that the upper end of the punch member is above the upper end 20 of tubular body 14 before the seal plug 30 is attached to insure that tool extension 42 is received in recess 44 before the threads of the seal plug member 30 engage the threads on the tubular body 14.

The illustration of alternate means of obtaining sealed closure of the T fitting as contained in FIGS. 3 through 9 is not intended to be exhaustive but only indicative of the various arrangements which may be made in keeping within the scope of the invention.

While a circular cross-sectioned O-ring type gasket 46 has been illustrated the invention is not so limited. Gaskets having square, rectangular or irregular cross-sections are all within the scope of this invention.

While the invention has been described with a certain degree of particularity, it is manifest that many changes may be made in the details of construction and the arrangement of components without departing from the spirit and scope of this disclosure.

What is claimed:

1. For use with a self-punching T fitting having a tubular body with threads formed in the internal surface thereof, the lower end of the tubular body being adaptable for welding to a pipe, the upper end of the tubular body being open, and including a punch having an externally threaded cylindrical portion threadably received in the tubular body, the lower end of the punch member being configured to engage and punch a hole in a pipe by rotated threaded advancement, the punch member having a tool engaging recess in the upper end thereof, a removable seal plug for closing the upper end of the tubular body comprising:

a cylindrical member threadably receivable at the upper end of said tubular body and having an integral, axially, downwardly extending tool extension slidably and nonrotatably receivable in said tool engaging recess in said punch member.

2. A seal plug according to claim 1 including a resilient gasket means positioned on the exterior surface thereof compressibly engageable with said tubular body.

3. A seal plug according to claim 1 wherein said seal plug includes an integral enlarged diameter flange portion engageable with the upper end of said tubular portion.

4. A seal plug according to claim 1 wherein said tubular body has threads on the external surface at the upper end thereof and wherein said seal plug includes an internal axial threaded recess threadably receiving said upper end of said tubular body.

5. A seal plug according to claim 1 having a tool receiving opening in the upper end thereof.

6. A self-punching T fitting adaptable for affixing to a vessel, such as a pipe, whereby fluid communication may be provided with said vessel, comprising:

a tubular body having an upper and a lower end and threads formed in the internal surface thereof;

a tubular branch member engaging and integrally formed with said body intermediate the ends thereof, the interior of said tubular branch member communicating with the interior of said body member;

a cylindrical punch member having an externally threaded portion threadably engaging said internal threads of said body member, said punching member lower end terminating in a reduced diameter punch end, said punching member having a tool receiving recess in the upper end thereof;

a removable seal plug member having an integral axial downwardly extending tool extension slidably and nonrotatably receivable in said tool recess in said punch member, the seal plug member being removably threadably secured to the upper end of said tubular body.

7. A self-punching T fitting according to claim 6 wherein the linear dimensioning of the tubular body above said branch member, said punch member and said seal plug member, all as measured parallel the longitudinal axis thereof, are such that with said plug member tool extension received in said punch member tool recess and said plug member fully threadably secured to said tubular member, said plug member externally threaded portion is nonrotatably retained above said branch member.

8. A self-punching T fitting acocrding to claim 6 wherein said seal plug member has a tool receiving recess in the upper end thereof of the same cross-sectional configuration as said tool receiving recess in said punch member whereby the same tool may be used to rotate both members.

9. A self-punching T fitting according to claim 6 wherein said seal plug member is defined in part by a cylindrical externally threaded member having the same diameter and thread pitch as said punch member and said plug member being threadably received in the upper end of said tubular body.

10. A self-punching T fitting according to claim 6 including a resilient gasket means compressibly positioned between said tubular body and said seal plug member.

11. A self-punching T fitting having an improved seal plug means according to claim 10 wherein said seal plug member has a groove in the exterior cylindrical surface receiving said resilient gasket therein.

12. A self-punching T fitting according to claim 10 wherein said seal plug member includes an upper enlarged diameter flange portion and wherein said flange portion has a groove in the lower planar surface thereof intermediate the circumferential surface of said cylindrical portion and the flange portion circumferential surface, said groove receiving said resilient gasket therein.

13. A self-punching T fitting according to claim 10 wherein said seal plug member includes an upper enlarged diameter flange portion and wherein said tubular body member has a downwardly extending groove in the upper end planar surface intermediate the inner and outer circumference thereof, said groove receiving said resilient gasket means therein, said gasket means sealably engaging the lower planar surface of said seal plug member flange portion.

14. A self-punching T fitting having an improved plug means according to claim 10 wherein said tubular body member has an annular groove in the internal surface thereof adjacent the top end, said groove receiving said resilient gasket means therein, said gasket means sealably engaging said plug member.

15. A self-punching T fitting acocrding to claim 10 wherein said tubular member has an enlarged diameter recess communicating with the upper end thereof and said plug member has a reduced external diameter recess therein, said gasket means being sealably positioned in and between said recesses.

16. A self-punching T fitting according to claim 10 wherein said tubular body has threads on the external surface at the upper end thereof and wherein said seal plug includes an internal axial threaded recess threadably receiving said upper end of said tubular body.

References Cited

UNITED STATES PATENTS

| | | | |
|---|---|---|---|
| 2,794,352 | 6/1957 | Mueller | 77—42 |
| 2,839,075 | 6/1958 | Mueller | 77—42 |
| 3,045,511 | 7/1962 | Risley | 77—38 |
| 3,307,435 | 3/1967 | Floren | 77—42 |
| 3,428,075 | 2/1969 | Wagner | 137—318 |

GERALD A. DOST, Primary Examiner

U.S. Cl. X.R.

137—318